June 2, 1936.  C. T. WALTER  2,042,644
SAUSAGE CASING
Filed April 4, 1934  2 Sheets-Sheet 1
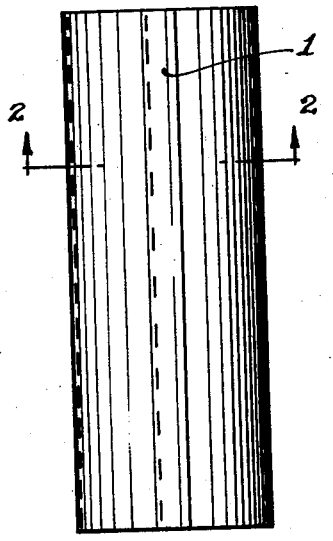
Fig.1
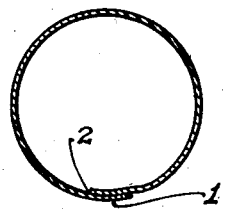
Fig.2
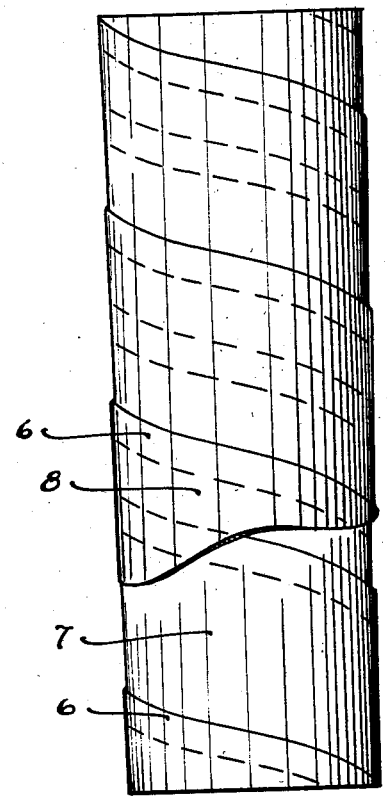
Fig.5
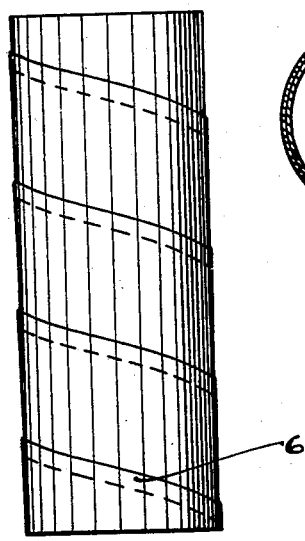
Fig.4
Fig.3
Charles T. Walter
INVENTOR
BY Roy W. Johns
ATTORNEY
WITNESS-
Wm. C. Meiser June 2, 1936.  C. T. WALTER  2,042,644
SAUSAGE CASING
Filed April 4, 1934  2 Sheets-Sheet 2

Charles T. Walter.
INVENTOR
BY Roy W. Johns
ATTORNEY

WITNESS:
Wm. C. Meiser

Patented June 2, 1936

2,042,644

UNITED STATES PATENT OFFICE 2,042,644

SAUSAGE CASING

Charles T. Walter, Chicago, Ill., assignor to Industrial Patents Corporation, Chicago, Ill., a corporation of Delaware Application April 4, 1934, Serial No. 718,953

19 Claims. (Cl. 99—176)

This invention relates to an artificial sausage casing and more particularly to cellulose tubes adapted to be used as casings for sausage meat, sausage specialties and the like.

The most widely used type of sausage casing is prepared from animal intestines. For certain purposes, however, it has been found desirable to utilize other substances such as cellulose, as described for example in United States Patent No. 1,070,776 to Cohoe and Fox.

It has been proposed to prepare cellulose casings in the form of thin-walled tubes by coating a mandrel with a solution of viscose or by extruding viscose through an appropriate orifice and by treatment, prepare a relatively strong, thin, transparent casing resembling the natural casing in many ways.

The present invention is directed to an improved method of preparing cellulose casings whereby the desired strength and desired characteristics of stretching and the like may be secured. The present invention contemplates the preparation of casings from sheet cellulose.

In the drawings similar reference characters indicate similar items in the several figures.

Figure 1 is a side view of one embodiment of the invention.

Figure 2 is a section through 2—2 of Figure 1.

Figure 3 is a section showing a convolutely wound casing of increased wall thickness due to the employment of superimposed laminations or more than one layer of sheeting.

Figure 4 is a side view of a casing prepared by spirally winding cellulose ribbon.

Figure 5 is a side view of a multiple layer spirally wound casing.

Figure 7:
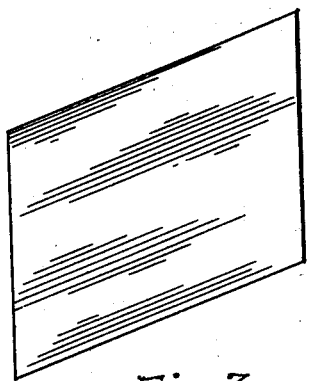
Figure 7 is a plan view showing the shape of a sheet for preparing the casing shown in Figure 6.

The present invention involves the discovery that cellulose sheeting may be joined together by using a cellulose substance as a bonding agent and then converting the cellulose substance into a relatively pure cellulose which is insoluble in water by subsequent treatment.

Cellulose sheeting is porous. In carrying out the present invention, a cellulose substance solution such, for example, as cellulose viscose is applied to the surfaces to be joined. The viscose is forced into the pores of the two adjacent cellulose sheet surfaces and then regenerated, forming a strong bond between the two cellulose sheets, which bond, of course, results from the regenerated film of cellulose extending into the pores of the adjacent sheet surfaces. The regenerated film between the two sheets is insoluble, elastic and porous and displays all the characteristics of the cellulose sheets which have been fastened.

In describing this invention, transparent cellulosic paper 0.00088 inches in thickness, which has not been water proofed, will be used as an example of cellulose sheeting and cellulose viscose will be used as an example of the bonding agent. It will be understood of course that other sheeting may be used with equal success and that other materials as cellulose acetate or cellulose nitrate for example might be used as a bonding agent by treating the material to convert it to pure cellulose after application to the sheeting. For example, if cellulose nitrate were used as the bonding agent, the cellulose nitrate would be denitrated to produce a film having the desired characteristics. Again, for example, cellulose dissolved in ammoniacal copper sulphate (Schweitzer's reagent) may be used as a bonding agent and by subsequent treatment transformed into pure cellulose in much the same manner as the viscose process.

Although the invention will be hereinafter described as practiced with cellulose viscose, it will be understood that this description is by way of illustration and not by way of limitation.

In the form of casings shown in Figures 1 and 2 a sheet of cellulose of appropriate size is formed into a tube or cylinder by overlapping the longitudinal edges, to form joint 1, using viscose as the bonding agent. The viscose is regenerated as will be described later in this specification, forming a film or weld of cellulose as at 2. Where greater strength is desired, a laminated structure may be prepared as is shown in Figure 3, which depicts the cross section of a casing which is two thicknesses of sheeting throughout except at the overlap portion 3 which is three sheets in thickness. All contacting surfaces in a casing made as shown in Figure 3 may be bonded with viscose to be later regenerated, or if desired the bonding agent may be used only adjacent the end or edge 4 and the edge 5. In practice the simple lap joint 1 is formed by applying to the surface of the sheet adjacent one edge, a thin film of properly aged cellulose viscose.

The cellulose viscose may be prepared by soaking cotton in a fifteen to twenty per cent solution of sodium hydroxide for one to two hours at 10° C. or thirty minutes at 25 to 30° C. The mass is then pressed to a weight equal to three times the weight of the cotton, which is as dry as the material can be pressed with an ordinary press.

The pressed mat is picked apart or shredded, permitted to stand for a short time and then treated in a sealed container with carbon bisulfide to the extent of forty to fifty per cent of the cotton weight. The treatment with carbon bisulfide is allowed to proceed at room temperature for three to five hours until a deep orange color appears. The material is then dissolved in water to the desired concentration. After proper aging at suitable temperature the viscose is ready for use.

Cellulose viscose as used in the industry is considerably more viscous than necessary for the purposes of the present invention and may be diluted from one to four times its volume with water which brings about a condition very satisfactory for the purposes of the present invention. In this condition, the viscose flows onto the sheet readily and its sticking action is almost instantaneous, the joint becoming very strong after it has dried in the air for a few seconds. After the joint has been thus produced, the casing is immersed in a regenerating bath which may be an almost saturated solution of sodium sulphate acidified with sulphuric acid to the extent of about one per cent.

After a few minutes in the regenerating bath the viscose is completely regenerated and becomes transparent and insoluble, providing a joint which resists water and holds firmly. After removal from the regenerating bath, the casings are thoroughly washed to remove any salts or acids which may be present and they may then be used. In practice it has been found desirable to treat the finished casings with a dilute solution of glycerin in water which serves to prevent the casings from becoming dry and cracking.

Preferably, the casings are made from glycerin free cellulose sheets, although a reasonably strong joint may be secured even though glycerin is present in the sheet before the bonding material is applied. It is preferable in practice to produce casings larger than about 1⅞ inches in diameter with a greater wall thickness than casings having a small diameter. In the practice of the present invention, casings of increased wall thickness are formed from sheet cellulose by laminating two or more sheets of cellulose so as to form a casing having the desired mechanical strength. A casing of the type shown in Figure 1 may be made with increased wall thickness by convolutely winding a sheet in the manner indicated in Figure 3. Similarly, casings of single thickness or laminated walls may be produced by spirally winding a cellulose ribbon. For example, the casing shown in Figure 4 is comparable to the casing shown in Figure 1, the wall thickness being identical, there being in each instance a double thickness of the sheeting at the lap joint, augmented in each instance, of course, by the presence of the bonding agent, the difference being that the lap joint 1 of Figure 1 is parallel to the axis of the casing, whereas in the casing shown in Figure 4, the lap joint 6 is spiral. It will be seen, therefore, that Figure 4 is comparable to Figure 1 and Figure 5 is comparable to Figure 3, Figures 1 and 3 showing a convolutely wound casing and Figures 4 and 5 disclosing a spirally wound casing, Figures 3 and 5 having increased wall thickness by reason of the lamination of a plurality of sheets.

The casing shown in Figure 4 is one layer of sheeting in thickness except at the joints, where it is two layers in thickness. The casing shown in Figure 5 is a multiple layer spirally wound casing. The innermost layer 7 is wound with an overlap, upon itself, 6, forming a lap joint identical to that shown in Figure 4 and bonded with viscose. The outer layer 8 is also spirally wound with an overlap 6. The outer sheet or ribbon is completely covered with viscose on the inner surface before being wound about the innermost layer, with the result that it is firmly attached to the innermost layer 7 at all points.

It will be noted that the lap joint 6 of layer 8 is positioned so that it does not superimpose the lap joint 6 of layer 7. This construction results in a very strong casing which is highly transparent.

Figure 8:
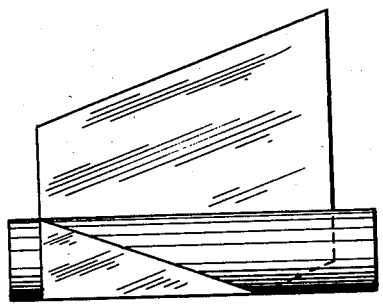
Figure 8 is a perspective view disclosing the manner in which a sheet such as is shown in Figure 7 may be formed into a casing such as is shown in Figure 6.
Figure 6:
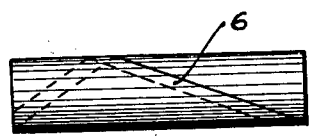
Figure 6 is a side view of a casing prepared by spirally winding bias-cut cellulose sheeting.
Figure 9:
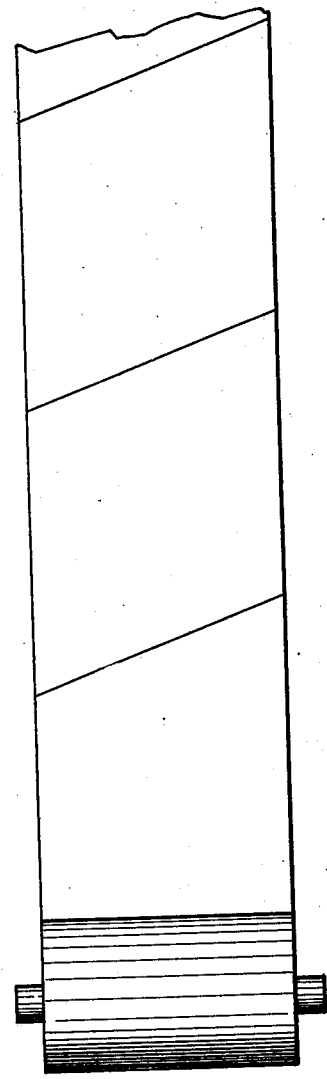
Figure 9 is a perspective view showing the pattern by which sheets shaped as shown in Figure 7 may be cut without waste.

Figure 6 discloses a casing made in accordance with the present invention which differs from the casings disclosed in Figures 1, 4 and 5. The casing of Figure 6 is prepared from a diamond shaped sheet as shown in Figure 7, being wound on a mandrel in the manner shown in Figure 8. The spirally wound, multiple ply casing differs from the convolutely wound multiple ply casing in directional resistance to stretch.

In the manufacture of sheet cellulose of the type commonly used for wrapping material or in the manufacture of cellulose casings, the cellulose material acquires a grain which runs parallel to the direction the film travels during the processing. When a cellulose film is subjected to tension in this direction, it shows a load-stretch ratio and an ultimate strength much greater than when it is subjected to tension at right angles to the grain.

For example, in actual test a sample of cellulose sheeting, which had not been moisture-proofed, .0016 inch in thickness by one inch in width, thoroughly wetted with pure water, was found to stretch slightly more than five per cent by a load of two pounds pulling parallel to the grain whereas the same load applied at right angles to the grain caused a stretch of thirty-four per cent. It will be seen, therefore, that the grain of the cellulose sheeting has an important bearing on the strength characteristics of the finished casing. When the grain of the material is parallel to the axis of the casing such casing will show great axial strength with little stretch in that direction combined with relative diametric weakness and relatively great diametric stretch.

The seamless cellulose casing in common use is of this type, rendering control of the diameter of the finished product difficult but having advantages in stuffing out certain types of sausage products.

In casings of the spirally wound construction in which a narrow ribbon is used, the grain of the sheet is caused to be disposed very close to a right angle to the axis of the casing. Casings of this construction exhibit a remarkable resistance against increase in diameter but tend to change in length when stuffed out. It will be seen, therefore, that the present invention contemplates the production of casings with greater or less resistance to diametric expansion as may be desired for different purposes.

If desired, of course, the spirally wound type of casing may be prepared with the grain parallel to the axis of the casings. It will be further understood that any suitable means may be employed in preparing the several embodiments of the present invention described herein by way of illustration without departing from the spirit of the invention as defined in the following claims.

I claim:

1. A sausage casing comprising a thin, cellulosic wall including a seam secured by regenerated cellulose.

2. A cellulosic sausage casing prepared from sheet cellulose having a seam longitudinal with the axis thereof formed by the regeneration of cellulose viscose.

3. A sausage casing comprising side walls in cylindrical form prepared from sheet cellulose, said cellulose being wound spirally to the axis of the casing and having seams bonded with regenerated cellulose viscose.

4. A sausage casing comprising a plurality of layers of cellulose sheeting laminated with regenerated cellulose viscose as the bonding agent.

5. A sausage casing comprising convolutely wound cellulose sheeting laminated with regenerated cellulose viscose as the bonding agent.

6. A sausage casing comprising a plurality of layers of spirally wound cellulose sheeting laminated with regenerated cellulose viscose.

7. A sausage casing comprising a convolutely wound bias-cut cellulose sheet bonded with regenerated cellulose viscose.

8. The method of preparing a sausage casing which comprises convolutely winding a cellulose sheet in cylindrical form, overlapping the edges, applying cellulose viscose to the adjacent surfaces and regenerating the cellulose viscose.

9. The method of preparing a sausage casing which comprises convolutely winding a cellulose sheet in cylindrical form, overlapping the edges, applying cellulose viscose to the adjacent surfaces, regenerating the cellulose viscose and washing.

10. The method of preparing a sausage casing which comprises convolutely winding a cellulose sheet in cylindrical form, overlapping the edges, applying cellulose viscose to the adjacent surfaces, regenerating the cellulose viscose, washing and treating with glycerin.

11. The method of preparing a sausage casing which comprises spirally winding a cellulose sheet in cylindrical form, overlapping the edges, applying cellulose viscose to the adjacent surfaces and regenerating the cellulose viscose.

12. The method of preparing a sausage casing which comprises spirally winding a cellulose sheet in cylindrical form, overlapping the edges, applying cellulose viscose to the adjacent surfaces, regenerating the cellulose viscose and washing.

13. The method of preparing a sausage casing which comprises spirally winding a cellulose sheet in cylindrical form, overlapping the edges, applying cellulose viscose to the adjacent surfaces, regenerating the cellulose viscose, washing and treating with glycerin.

14. The method of preparing sausage casings which comprises winding a plurality of layers of cellulose sheeting, causing said layers to adhere to each other by the application of cellulose viscose, regenerating the cellulose viscose and subsequently washing and then treating the finished casing with glycerin.

15. The method of preparing a sausage casing which comprises appropriately winding cellulose sheeting in a manner to form an overlap at the edges, bonding said overlap with a cellulose material capable of regeneration and subsequently regenerating said bonding agent into cellulose.

16. The method of preparing a sausage casing which comprises appropriately winding cellulose sheeting in a manner to form an overlap at the edges, bonding said overlap with a cellulose material capable of regeneration and subsequently treating said bonding agent to transform it into a material similar to the material of the sheeting.

17. The method of preparing a sausage casing which comprises bias-cutting cellulose sheeting in the form of a diamond shaped parallelogram, convolutely winding said diamond shaped parallelogram, forming a spiral overlap, bonding said spiral overlap with cellulose viscose and subsequently regenerating the cellulose viscose.

18. A seamed cellulosic casing having the grain of the cellulose material parallel to the axis of the casing.

19. The method of preparing a sausage casing which comprises winding cellulose sheeting in a manner to cause an overlap at the edges, bonding said overlap with a cellulose material capable of regeneration and subsequently regenerating said bonding agent into cellulose forming a tube, the cellulose sheeting in said tube being wound with the grain of the sheet substantially parallel to the axis of the casing.

CHARLES T. WALTER.